A. N. PRICE & MILO HARRIS.
Corder for Sewing-Machine.
No. 127,103. Patented May 21, 1872.
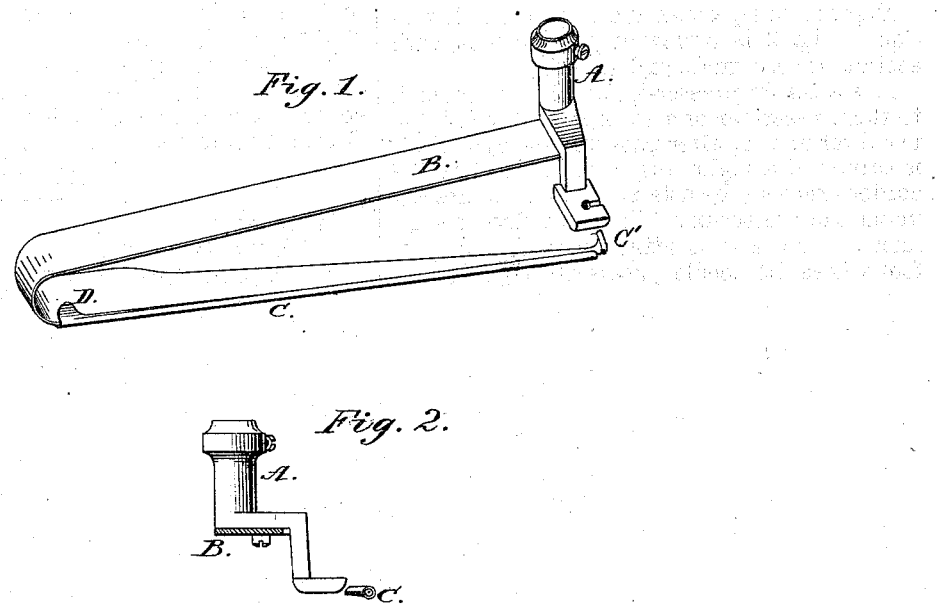
Witnesses:
Edw. W. Donn
M. Gardner
Inventors:
Adam N. Price
Milo Harris

UNITED STATES PATENT OFFICE.

ADAM N. PRICE AND MILO HARRIS, OF JAMESTOWN, NEW YORK.

IMPROVEMENT IN CORDERS FOR SEWING-MACHINES.

Specification forming part of Letters Patent No. 127,103, dated May 21, 1872.

SPECIFICATION.

Specification describing certain Improvements in Cording Attachments for Sewing-Machines, invented by ADAM N. PRICE and MILO HARRIS, of Jamestown, in the county of Chautauqua and State of New York.

Our invention relates to a corder attached to the presser-foot of a sewing-machine, and constructed as hereinafter described.

Figure 1 is a perspective view of the invention. Fig. 2 is a view of presser-foot, with section of cord-guide and shield.

A is a corder presser-foot, which is attached to the presser-bar of a sewing-machine in the usual form, and, after passing below said bar, is turned at a right angle in order that the corder-arm may be attached in a line directly under the presser-bar. In the corders in common use the arm is attached to the presser-foot where the needle passes through it, and is very much in the way of threading the needle and of inserting the cloth to be corded. This difficulty we overcome entirely by making the presser-foot as stated, and attaching the corder-arm B to it, as shown in Fig. 1. The lower member of the corder that passes between the material is provided along its edge with a lip, C D, and at its end with shorter lip C'. These lips are hook-like, and guide the cord, which may be easily inserted within them quite to the guide in the presser.

We claim as our invention—

The cording device shown and described, consisting of the foot, its bent arm, and lips C D C', all combined as set forth.

ADAM N. PRICE.
MILO HARRIS.

Witnesses:
EDW. W. DONN,
M. GARDNER.